(12) United States Patent
Obata et al.

(10) Patent No.: US 7,413,618 B2
(45) Date of Patent: Aug. 19, 2008

(54) SILVER ALLOY FOR REFLECTIVE FILM

(75) Inventors: Tomokazu Obata, Isehara (JP); Hiroshi Yanagihara, Isehara (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 311 days.

(21) Appl. No.: 10/534,288

(22) PCT Filed: Oct. 29, 2004

(86) PCT No.: PCT/JP2004/016097

§ 371 (c)(1),
(2), (4) Date: May 9, 2005

(87) PCT Pub. No.: WO2005/056848

PCT Pub. Date: Jun. 23, 2005

(65) Prior Publication Data

US 2006/0093510 A1    May 4, 2006

(30) Foreign Application Priority Data

Dec. 10, 2003 (JP) .......................... P2003-411718

(51) Int. Cl.
*C22C 5/06* (2006.01)
(52) U.S. Cl. ....................... 148/430; 420/501
(58) Field of Classification Search ................ 148/430; 420/501, 502–506
See application file for complete search history.

(56) References Cited

U.S. PATENT DOCUMENTS 6,294,738 B1 * 9/2001 Seuntjens ................ 174/125.1
2004/0028912 A1 * 2/2004 Tauchi et al. ................ 428/434
2004/0226818 A1 * 11/2004 Takagi et al. ........... 204/298.13

FOREIGN PATENT DOCUMENTS

| JP | 2000-109943 | | 4/2000 |
|---|---|---|---|
| JP | 2001-126315 | | 5/2001 |
| JP | 2001184725 | A * | 7/2001 |
| JP | 2002-319185 | | 10/2002 |
| JP | 2002-332568 | | 11/2002 |
| JP | 2003-160859 | | 6/2003 |
| JP | 2003-293055 | | 10/2003 |
| JP | 2004-131747 | | 4/2004 |
| JP | 2004131747 | A * | 4/2004 |

* cited by examiner

*Primary Examiner*—Roy King
*Assistant Examiner*—Janelle Morillo
(74) *Attorney, Agent, or Firm*—Roberts & Roberts, LLP

(57) ABSTRACT

The present invention provides a silver alloy for use in a reflection film in an optical recording medium, comprising silver as a main component, and at least one metal element as a first additive element having lower melting point than that of silver. Preferable first additive elements in the present invention are aluminum, indium, tin, bismuth, gallium, zinc, strontium, calcium and germanium. Further, second additive elements in the present invention are preferable if they contain at least one of elements comprising platinum, gold, rhodium, iridium, ruthenium, palladium, lead, copper, manganese, silicon, nickel, chrome, cobalt, yttrium, iron, scandium, zirconium, titanium, niobium, molybdenum, tantalum, tungsten, hafnium, lanthanum, cerium, praseodymium, neodymium, samarium, europium, gadolinium, terbium, dysprosium, holmium, thulium, ytterbiumm, magnesium, and boron.

8 Claims, 4 Drawing Sheets

SILVER ALLOY FOR REFLECTIVE FILM

CROSS REFERENCE TO RELATED APPLICATION

This application is a 35 USC § 371 National Phase Entry Application from PCT/JP2004/16097, filed Oct. 29, 2004, and designating the United States.

TECHNICAL FIELD

The present invention relates to a silver alloy suitable as a constituent material for a reflection film to be provided in an optical recording medium, display or the like, and especially to a silver alloy for a reflection film, which is capable of maintaining reflectivity during a long-term service.

BACKGROUND ART

Silver is said to be the most preferable material for a reflection film being used in an optical recording medium, display or the like. The reason is that silver, in addition to a high reflectivity, is less expensive than gold which also has a high reflectivity. Especially, in the field of optical recording media, application of materials having higher reflectivity has been demanded as the field makes the transition to recordable and rewritable media such as CD-R/RW and DVD-R/RW/RAM. This is ascribable to a cause that organic dye materials have been widely used as a constituent material for a recording layer in recordable and rewritable media, and organic dye materials lead to a greater attenuation of laser, so that the attenuation should be complemented by improving the reflectivity of a reflection film.

In contrast, silver is poor in corrosion resistance, thereby has a drawback that corrosion changes the color of silver into black and will deteriorate the reflectivity. One of the factors contributing a corrosion of a reflection film is that for example the film has a poor corrosion resistance to an organic dye material which is applied to a recording layer in an optical recording medium although it varies according to equipment on which the film is applied, and as a result deterioration in reflectivity can be recognized after a long-term use. A reflection film in a display is likely to be corroded due to moisture or the like in the atmosphere.

There is further an issue of deterioration in reflectivity to a reflection film comprising silver caused by heat. Although it is not known exactly how heat deteriorates a reflectivity, a phenomenon has been confirmed that when a silver thin film is heated, the thin film gets local coagulation and exposes its substrate layer. Therefore, heat resistance is also required to a reflection film used for an optical recording media, plasma display or the like because the film is subjected to heat.

In order to address the above-discussed issue of deterioration in a reflectivity of a reflection film, developments of a silver alloy for use in a reflection film have been conventionally carried out in which both corrosion resistance and heat resistance are increased while a reflectivity is insured. Many of the reflection films have silver as a main component and are added by one or two or more various additive elements. For instance, it is disclosed 0.5-4.9 atm % of palladium has been added to silver. These silver alloys are said to have a good corrosion resistance, can maintain reflectivity under an environment of service, thereby being suitable as a reflection film. Refer to Patent Document 1 for details of the earlier technology. Patent Document 1: Japanese Patent Application Laid-open No. 2000-109943 With respect to the above-discussed silver alloys, some tentative improvements are recognized in terms of corrosion resistance and heat resistance. However, there is no guarantee that these silver alloys do not deteriorate at all under an environment of service. There is also no guarantee against deterioration in reflectivity, and so that materials capable of maintaining a higher level of reflectivity have been demanded.

In the field of optical recorders, red semiconductor laser (wavelength of 650 nm) is currently applied as a light source for recording, however practical use of blue laser (wavelength of 405 nm) has been in sight recently. Application of blue laser can insure a five- or six-fold storage capacity compared to the present optical recorders, so that it is considered blue laser-applied optical recorders will become mainstream in the next-generation ones. In this regard, the present inventors have confirmed the reflectivity of a reflection film will fluctuate in accordance with the wavelength of laser to be irradiated, and especially have confirmed irradiation of laser having a short-wavelength will cause deterioration in reflectivity irrespective of presence or absence of corrosion and the deterioration in reflectivity due to corrosion will be more substantial in degree than in a case of irradiation of laser having a long-wavelength. Thus, in order to manufacture recording media capable of addressing the future development of light sources for recording, it is desired a development of materials having a higher reflectivity with respect to irradiation of laser of short-wavelength band and further capable of maintaining reflectivity within a practical scope of use.

The present invention has been made against the above background, and relates to a silver alloy composing a reflection film in an optical recording medium or the like. It is an objective of the invention to provide a material capable of serving with the reflectivity kept not deteriorated due to a long-term use. Furthermore, the present invention provides a material having a higher reflectivity with respect to laser beams of short-wavelength.

DISCLOSURE OF THE INVENTION

In order to solve the problems, the present inventors made a selection of preferable additive elements with silver centered on similarly to the earlier technologies. As a result thereof, the present inventors found metal elements having lower melting point than that of silver have an effect of maintaining reflectivity when added as an additive element and are useful in improving heat resistance, moisture resistance, or sulfur resistance, thereby came up with the present invention.

The present invention is drawn to a silver alloy for use in a reflection film in an optical recording medium, comprising silver as a main component, and at least one metal element as a first additive element having lower melting point than that of silver.

Selection of metallic elements as a first additive element having a melting point lower than silver depends on which properties of a thin film should be given weight to. To the best of the present inventors' knowledge, low-melting metallic elements useful in improving the properties of a thin film comprising silver are aluminum, indium, tin, bismuth, gallium, zinc, strontium, calcium and germanium, and out of these elements, aluminum, indium and tin are especially useful in improving a sulfur resistance of a thin film. On the other hand, bismuth, gallium, zinc, strontium, calcium and germanium are useful in improving heat resistance and moisture resistance. Therefore, inclusion of at least one of these metallic elements allows a silver thin film to have high reflectivity.

The present inventors' study confirmed a silver alloy added with gallium among the low-melting metallic elements raised above as a first additive elements contributes to maintaining especially a higher level of properties requird for a reflection film. The silver-gallium alloy is preferable not only to a reflection layer for an optical recording medium but also to a reflection film for a display.

Further in the present invention, it is preferable if at least one of elements comprising platinum, gold, rhodium, iridium, ruthenium, palladium, lead, copper, manganese, silicon, nickel, chrome, cobalt, yttrium, iron, scandium, zirconium, titanium, niobium, molybdenum, tantalum, tungsten, hafnium, lanthanum, cerium, praseodymium, neodymium, samarium, europium, gadolinium, terbium, dysprosium, holmium, thulium, ytterbiumm, magnesium, and boron is added as a second additive element. These elements act multiply with the first additive elements to improve sulfur resistance, moisture resistance, and heat resistance.

Especially, a silver alloy added with, as a second additive elements, platinum, palladium, thulium, or dysprosium is a preferable alloy, which can effectively inhibit coagulation, which will generate in a thin film material in an humidified environment.

A concentration of the additive elements, namely a total of the concentration of the first and second additive elements is preferable if it is adjusted to 0.01-5.0 atomic %. The reason is that an added amount of less than 0.01 atomic % will have no effect of maintaining reflectivity, and a concentration of the additive elements exceeding 5.0 atomic % will deteriorate the reflectivity significantly in some environment and wavelength of incident laser beam, thereby guaranteeing quality reflectivity. A preferable concentration in particular is 0.01-1.5 atomic % because reflectivity of higher level can be maintained irrespective of environment and wavelength of incident laser beam.

The silver alloy as a material for a reflection film according to the present invention as discussed above can be produced through a melting casting process or sintering process. There is no specifically difficult point in producing the silver alloy through a melting casting process, and it can be produced through a commonly used process where each raw material is checkweighed, melt, mixed, and cast. There is also no specifically difficult point in producing the silver alloy through a sintering process, and it can be produced through a commonly used process where each raw material is checkweighed and sintered.

The silver alloy according to the present invention has preferable properties for reflection films, and is inhibited from deterioration in reflectivity in a working process. Further as will be discussed later, the silver alloy shows better and sustainable reflectivity compared with the conventional materials for reflection films under irradiation of a short-wavelength laser beam. As discussed above, a sputtering process has been generally applied in producing reflection films for optical recording media. Therefore, the sputtering process comprising the silver alloy according to the present invention can produce optical recording media, displays or the like provided with reflection films having preferable properties.

As discussed above, the present invention can produce reflection films with less deterioration in reflectivity after a long-term use, thereby prolonging durability of various equipment such as optical recording media, displays or the like to which reflection films are applied. Further, the silver alloy according to the present invention shows better and sustainable reflectivity compared with the conventional materials for reflection films under irradiation of a short-wavelength laser beam. Thus, the present silver alloy can be applied to recording media for optical recorders using a short-wavelength laser as a light source, which are expected to take root in the future.

BEST MODE FOR CARRYING OUT THE INVENTION

Hereinafter, a preferred example of the present invention will be described together with a comparative example. In the example, various silver alloys of binary and ternary compositions having silver as a main component were produced, with which targets were produced, and thin films were formed through a sputtering method. Thus formed thin film were subjected to corrosion tests (acceleration tests) under various environments for studying variations in reflectivity of post corrosion tests.

In producing a silver alloy, each metal was checkweighed to reach a predetermined concentration, was molten in a high-frequency melting furnace and mixed to prepare an alloy. Then, it was poured into a mold to solidify for preparing an ingot, which was forged, rolled, heat treated, and formed to produce a sputtering target.

In producing a thin film, a substrate (borosilicate glass) and a target were placed in a sputtering apparatus. After a vacuum was drawn in the apparatus to a level of $5.0 \times 10^{-3}$ Pa, argon gas was introduced to a level of $5.0 \times 10^{-1}$ Pa. A film was formed under sputtering conditions with 4 kW of direct-current and time period of 8 seconds to make the film thickness 1200 Å. Film thickness distribution was confirmed within ±10%.

Thus produced thin film was first evaluated in terms of heat resistance and moisture resistance. Evaluation of these properties was done with the thin film exposed to an environment and with the reflectivity of a tested thin film measured while a wavelength was changed with the use of a spectrophotometer, and variation in reflectivity was inspected with the reflectivity in each wavelength of the silver of immediately after film formation standardized.

In a heat test for inspecting a heat resistance of the thin film, the thin film was placed on a hot plate, heated for 1 hour at 250° C. in the atmosphere, and evaluated in terms of reflectivity after heating. In humidification tests for inspecting a moisture resistance of the thin film, the thin film was exposed in the atmosphere having the temperature of 100° C. and the humidity of 100%, and evaluated in terms of reflectivity after humidifying. The humidification tests were carried out in two ways: one with an exposure time of 24 hours (Humidification Test I); and the other with an exposure time of 100 hours (Humidification Test II). Results of the corrosion tests are shown in Tables 1-3. The reflectivity values as shown in the tables are relative values to those of the silver of immediately after film formation being set as 100. Each measured value represents reflectivity in the wavelengths of 400 nm, 560 nm, and 650 nm (corresponding to the wavelength of blue, yellow, and red laser, respectively). For comparison, the tables further show test results on a thin film, which was made with the use of the target composed of pure silver.

TABLE 1

| Sample composition (at %) | Wavelength of incident light: 400 nm Reflectivity | | | |
|---|---|---|---|---|
| | Immediately after deposition | Heat test | Humidification test I | Humidification test II |
| Ag—3.9Al | 80.6 | 52.1 | 68.0 | 65.1 |
| Ag—0.9In | 92.4 | 62.3 | 63.2 | 52.8 |
| Ag—0.9Sn | 88.5 | 80.6 | 58.5 | 31.4 |
| Ag—1.4Sr | 90.8 | 84.1 | 86.4 | 81.6 |
| Ag—2.6Ca | 87.1 | 61.6 | 80.8 | 77.2 |
| Ag—0.5Al—0.5In | 97.9 | 56.1 | 90.6 | 89.9 |
| Ag—0.5In—0.4Sm | 104.3 | 91.1 | 80.7 | 35.7 |
| Ag—0.5In—0.8Cu | 101.1 | 89.9 | 87.4 | 70.7 |
| Ag—0.5In—0.5Bi | 94.4 | 71.4 | 80.4 | 51.6 |
| Ag—0.5In—0.5Ge | 94.7 | 90.1 | 88.1 | 84.0 |
| Ag—0.5Sn—0.4Cu | 92.1 | 89.1 | 79.5 | 63.2 |
| Ag (Comparison) | 100.0 | 30.5 | 45.9 | 37.5 |

TABLE 2

| Sample composition (at %) | Wavelength of incident light: 550 nm Reflectivity | | | |
|---|---|---|---|---|
| | Immediately after deposition | Heat test | Humidification test I | Humidification test II |
| Ag—3.9Al | 90.4 | 68.7 | 90.1 | 93.2 |
| Ag—0.9In | 96.5 | 76.0 | 85.3 | 76.2 |
| Ag—0.9Sn | 97.7 | 93.8 | 88.3 | 69.3 |
| Ag—1.4Sr | 99.4 | 94.7 | 97.6 | 96.2 |
| Ag—2.6Ca | 98.2 | 82.5 | 97.4 | 92.7 |
| Ag—0.5Al—0.5In | 98.8 | 73.8 | 95.0 | 95.6 |
| Ag—0.5In—0.4Sm | 99.7 | 92.8 | 85.8 | 69.7 |
| Ag—0.5In—0.8Cu | 100.0 | 92.8 | 85.8 | 69.7 |
| Ag—0.5In—0.5Bi | 98.9 | 80.6 | 89.3 | 62.0 |
| Ag—0.5In—0.5Ge | 97.3 | 95.1 | 92.5 | 89.4 |
| Ag—0.5Sn—0.4Cu | 98.7 | 97.7 | 89.1 | 75.1 |
| Ag (Comparison) | 100.0 | 52.5 | 78.4 | 67.8 |

TABLE 3

| Sample composition (at %) | Wavelength of incident light: 650 nm Reflectivity | | | |
|---|---|---|---|---|
| | Immediately after deposition | Heat test | Humidification test I | Humidification test II |
| Ag—3.9Al | 95.2 | 84.3 | 95.4 | 95.1 |
| Ag—0.9In | 97.4 | 79.6 | 85.8 | 81.0 |
| Ag—0.9Sn | 98.7 | 96.2 | 93.1 | 80.5 |
| Ag—1.4Sr | 100.0 | 95.9 | 98.1 | 96.6 |
| Ag—2.6Ca | 98.5 | 88.2 | 98.1 | 93.3 |
| Ag—0.5Al—0.5In | 98.8 | 76.0 | 95.6 | 96.1 |
| Ag—0.5In—0.4Sm | 99.1 | 92.9 | 86.8 | 42.0 |
| Ag—0.5In—0.8Cu | 99.9 | 92.3 | 86.0 | 71.3 |
| Ag—0.5In—0.5Bi | 99.3 | 81.5 | 89.9 | 63.7 |
| Ag—0.5In—0.5Ge | 98.3 | 97.0 | 95.0 | 92.4 |
| Ag—0.5Sn—0.4Cu | 99.3 | 98.6 | 89.3 | 75.4 |
| Ag (Comparison) | 100.0 | 60.5 | 86.0 | 78.6 |

It is known from the above results that the thin film produced with the silver alloy according to the present Example shows higher values than those of silver in terms of reflectivity, and improvement effect in heat resistance and moisture resistance was confirmed. As a general tendency, it is perceived the shorter a wavelength of incident light is, the lower the reflectivity becomes.

Next, targets comprising various silver alloys to which gallium had been added as a first additive element were produced, silver-alloy thin films (1200 Å) were produced, and properties thereof were evaluated. The producing process of the targets and sputtering conditions for producing the thin films are identical to those described above. In an evaluation, two tests were carried out. Specifically, heat tests identical to those as described above and humidification tests (Humidification test III) in which the thin films are exposed in an atmosphere of a temperature of 80° C. and a moisture of 85% for 24 hours were carried out. Tables 4-6 show results of the tests.

TABLE 4

| Sample composition (at %) | Wavelength of incident light: 400 nm Reflectivity | | |
|---|---|---|---|
| | Immediately after deposition | Heat test | Humidification test III |
| Ag—3.6Ga | 98.0 | 44.1 | 98.1 |
| Ag—0.5Ga | 95.6 | 51.5 | 96.3 |
| Ag—0.8Ga | 95.3 | 69.8 | 96.1 |
| Ag—1.5Ga | 91.0 | 84.2 | 91.0 |
| Ag—2.0Ga | 85.4 | 79.0 | 81.5 |
| Ag—0.8Ga—0.5Zn | 83.2 | 75.8 | 76.9 |
| Ag—0.2Ga—0.2Cu | 94.7 | 63.6 | 80.6 |
| Ag—0.5Ga—0.3Cu | 90.1 | 78.9 | 88.2 |
| Ag—1.0Ga—0.5Cu | 88.3 | 63.7 | 81.4 |
| Ag—0.25Ga—0.25Sn | 88.9 | 76.1 | 81.5 |
| Ag—0.5Ga—0.5Sn | 90.4 | 77.6 | 88.6 |
| Ag—0.2Ga—0.3Pd | 91.1 | 78.6 | 90.3 |
| Ag—0.5Ga—0.5Pd | 88.6 | 88.3 | 83.6 |
| Ag—1.0Ga—0.5Pd | 84.7 | 65.2 | 87.9 |
| Ag—0.5Ga—0.5In | 94.3 | 79.4 | 94.0 |
| Ag—0.2Ga—0.2In | 93.6 | 60.9 | 94.2 |
| Ag—1.2Ga—0.2In | 92.4 | 67.8 | 91.5 |
| Ag—0.6Ga—0.2In | 92.7 | 67.8 | 91.1 |
| Ag (Comparison) | 100.0 | 30.5 | 79.8 |

TABLE 5

| Sample composition (at %) | Wavelength of incident light: 550 nm Reflectivity | | |
|---|---|---|---|
| | Immediately after deposition | Heat test | Humidification test III |
| Ag—0.3Ga | 98.6 | 67.3 | 100.3 |
| Ag—0.5Ga | 97.7 | 73.0 | 99.5 |
| Ag—0.8Ga | 98.1 | 81.8 | 99.8 |
| Ag—1.5Ga | 97.0 | 94.8 | 98.5 |
| Ag—2.0Ga | 95.8 | 93.9 | 96.2 |
| Ag—0.8Ga—0.5Zn | 92.8 | 90.0 | 85.6 |
| Ag—0.2Ga—0.2Cu | 96.9 | 77.6 | 96.0 |
| Ag—0.5Ga—0.3Cu | 97.2 | 93.8 | 88.3 |
| Ag—1.0Ga—0.5Cu | 94.6 | 82.6 | 91.8 |
| Ag—0.25Ga—0.25Sn | 97.7 | 94.6 | 96.9 |
| Ag—0.5Ga—0.5Sn | 97.3 | 95.0 | 98.2 |
| Ag—0.2Ga—0.3Pd | 98.1 | 95.6 | 94.1 |
| Ag—0.5Ga—0.5Pd | 97.0 | 91.4 | 94.3 |
| Ag—1.0Ga—0.5Pd | 93.8 | 85.8 | 99.3 |
| Ag—0.5Ga—0.5In | 97.5 | 88.9 | 98.7 |
| Ag—0.2Ga—0.2In | 97.8 | 72.6 | 99.1 |
| Ag—1.2Ga—0.2In | 95.6 | 90.6 | 93.9 |
| Ag—0.6Ga—0.2In | 97.6 | 83.8 | 98.2 |
| Ag (Comparison) | 100.0 | 52.5 | 92.3 |

TABLE 6

| Sample composition (at %) | Wavelength of incident light: 650 nm Reflectivity | | |
|---|---|---|---|
| | Immediately after deposition | Heat test | Humidification test III |
| Ag—0.3Ga | 98.8 | 76.9 | 100.6 |
| Ag—0.5Ga | 98.1 | 80.9 | 99.8 |
| Ag—0.8Ga | 98.4 | 85.6 | 100.2 |
| Ag—1.5Ga | 97.7 | 96.3 | 99.2 |
| Ag—2.0Ga | 96.7 | 95.8 | 97.9 |
| Ag—0.8Ga—0.5Zn | 95.5 | 93.6 | 96.6 |
| Ag—0.2Ga—0.2Cu | 99.2 | 80.4 | 84.6 |
| Ag—0.5Ga—0.3Cu | 97.9 | 94.8 | 97.8 |

TABLE 6-continued

| Sample composition (at %) | Wavelength of incident light: 650 nm Reflectivity | | |
|---|---|---|---|
| | Immediately after deposition | Heat test | Humidification test III |
| Ag—1.0Ga—0.5Cu | 95.9 | 90.4 | 91.3 |
| Ag—0.25Ga—0.25Sn | 98.5 | 92.6 | 94.1 |
| Ag—0.5Ga—0.5Sn | 98.4 | 95.8 | 98.3 |
| Ag—0.2Ga—0.3Pd | 99.4 | 95.3 | 98.0 |
| Ag—0.5Ga—0.5Pd | 98.0 | 91.1 | 93.9 |
| Ag—1.0Ga—0.5Pd | 96.8 | 92.3 | 95.2 |
| Ag—0.5Ga—0.5In | 97.7 | 90.3 | 99.3 |
| Ag—0.2Ga—0.2In | 98.2 | 75.8 | 99.6 |
| Ag—1.2Ga—0.2In | 97.0 | 95.8 | 96.5 |
| Ag—0.6Ga—0.2In | 97.9 | 88.0 | 98.9 |
| Ag (Comparison) | 100.0 | 60.5 | 94.5 |

It is known from Tables 4-6 that the silver-alloy thin film to which gallium had been added as a first additive elements were improved in terms of heat resistance and moisture resistance similarly to those as described above. The silver-gallium-based alloys especially have a higher effect of maintaining reflectivity, and show good effect of maintaining reflectivity particularly with respect to incident light of a short wavelength. In this respect, it was confirmed a silver-gallium-based alloy thin film is useful in an application to a reflection film in a display, which demands a uniform reflectivity irrespective of a wavelength of incident light.

Next, sulfur tests were carried out with respect to a part of the thin film produced, in order to evaluate sulfur resistance and reflectivity of post sulfur tests were evaluated. In the sulfur tests, the thin films were immersed in a sodium sulfide solution of 0.01% having a temperature of 25° C. for an hour. The test results are shown in Table 7, from which it was confirmed that the alloy thin film according to the present example has a tendency to improved sulfur resistance in all wavelength bands.

TABLE 7

| Sample composition (at %) | Reflectivity | | | | | |
|---|---|---|---|---|---|---|
| | 400 nm | | 550 nm | | 650 nm | |
| | Immediately after deposition | After Test | Immediately after deposition | After Test | Immediately after deposition | After Test |
| Ag—0.9In | 92.4 | 65.0 | 96.5 | 81.6 | 97.4 | 86.8 |
| Ag—0.9Sn | 88.5 | 36.3 | 97.7 | 55.9 | 98.7 | 67.4 |
| Ag—3.9Al | 80.6 | 33.3 | 90.4 | 51.1 | 95.2 | 60.6 |
| Ag—0.2Ga—0.2Cu | 94.7 | 32.0 | 96.9 | 45.3 | 99.2 | 59.3 |
| Ag—0.5Ga—0.3Cu | 90.1 | 50.4 | 97.2 | 63.8 | 97.9 | 73.0 |
| Ag—1.0Ga—0.5Cu | 88.3 | 30.0 | 94.6 | 64.7 | 95.9 | 78.1 |
| Ag—0.2Ga—0.3Pd | 91.1 | 50.0 | 98.1 | 65.9 | 99.4 | 73.6 |
| Ag—0.5Ga—0.5Pd | 88.6 | 52.8 | 97.0 | 74.1 | 98.0 | 80.4 |
| Ag—1.0Ga—0.5Pd | 84.7 | 64.0 | 93.8 | 78.1 | 96.8 | 82.6 |
| Ag—0.5Ga—0.5In | 94.3 | 46.8 | 97.5 | 64.6 | 97.7 | 75.0 |
| Ag—0.2Ga—0.2In | 93.6 | 28.9 | 97.8 | 43.1 | 98.2 | 57.6 |
| Ag—1.2Ga—0.2In | 92.4 | 40.0 | 95.6 | 62.6 | 97.0 | 74.9 |
| Ag—0.6Ga—0.2In | 92.7 | 31.4 | 97.6 | 46.6 | 97.9 | 60.6 |
| Ag—0.5In—0.4Sm | 104.3 | 52.4 | 99.7 | 68.0 | 99.1 | 76.7 |
| Ag—0.5In—0.5Cu | 101.1 | 55.6 | 100.0 | 74.5 | 99.9 | 81.2 |
| Ag—0.5Al—0.5In | 97.9 | 37.3 | 98.8 | 50.5 | 98.8 | 63.5 |
| Ag—0.5In—0.5Bi | 94.4 | 37.6 | 98.9 | 56.8 | 99.3 | 69.0 |
| Ag—0.5In—0.5Ge | 94.7 | 47.2 | 97.3 | 65.3 | 98.3 | 74.9 |
| Ag—0.5Zn—1.7Cu | 95.6 | 38.7 | 98.1 | 54.7 | 98.4 | 68.1 |
| Ag (Comparison) | 100.0 | 20.2 | 100.0 | 25.5 | 100.0 | 43.7 |

Further, DVD-R media were produced with the use of a sputtering 10 target comprising a silver-gallium-base silver alloy produced in the present example, and were evaluated in terms of properties as a reflection film for an optical record medium. In this test, the used as a substrate was a polycarbonate substrate with a diameter of 120 mm, a board thickness of 0.6 mm, a groove depth of 0.17 µm, groove width of 0.3 µm, and a groove pitch of 0.74 µm, which had been produced with an injection molding machine having a stamper formed with a preformatting-pattern. Then, metal-containing azo-based recording ink was applied onto a top surface of the substrate through a spin coating process, the top surface was dried and subsequently formed with a reflection film having a thickness of 1200 Å with the use of a sputtering target as produced in the present example. Then, a polycarbonate substrate having the same size as the substrate was bonded onto the substrate with the use of ultraviolet-curing resin to produce a DVD-R medium.

The produced DVD-R medium was subjected to an optical disk evaluation unit (Optical Disk Evaluation Unit ODU 1000 made by Pulstec Industrial Co., Ltd.) to measure jitter values, PI error (PI8 error), and PO error at an early stage, and measured values were confirmed within the range of DVD standard. After the confirmation, an acceleration environmental test was carried out on the DVD-R medium, in which the medium was exposed in an environment with a temperature of 80° C. and with a relative humidity of 85% to measure respective values of the DVD-R medium of post acceleration environmental test with the use of the evaluation unit.

FIGS. 1-4 show relationships between humidification time and jitter values, PI error, PI8 error, and PO error. The figures also show results of similar tests carried out on a DVD-R medium having a reflection film of pure silver and on a commercially available DVD-R medium.

As will be understood from the figures, the recording medium having a reflection film comprising a silver-gallium-based silver alloy according to the present example meets the standard in terms of respective values even after long time of humidification, and the medium was confirmed to have long-lasting stability. In contrast, the recording medium having a reflection film of pure silver became unrecognizable by the recording equipment after humidification of 150 hours and became nonusable. It was also confirmed that the commercially available DVD-R medium exceeded the standard in terms of jitter values, and is inferior to the DVD-R medium according to the present example in terms of properties although the error values successfully cleared the standard.

Figure 1:
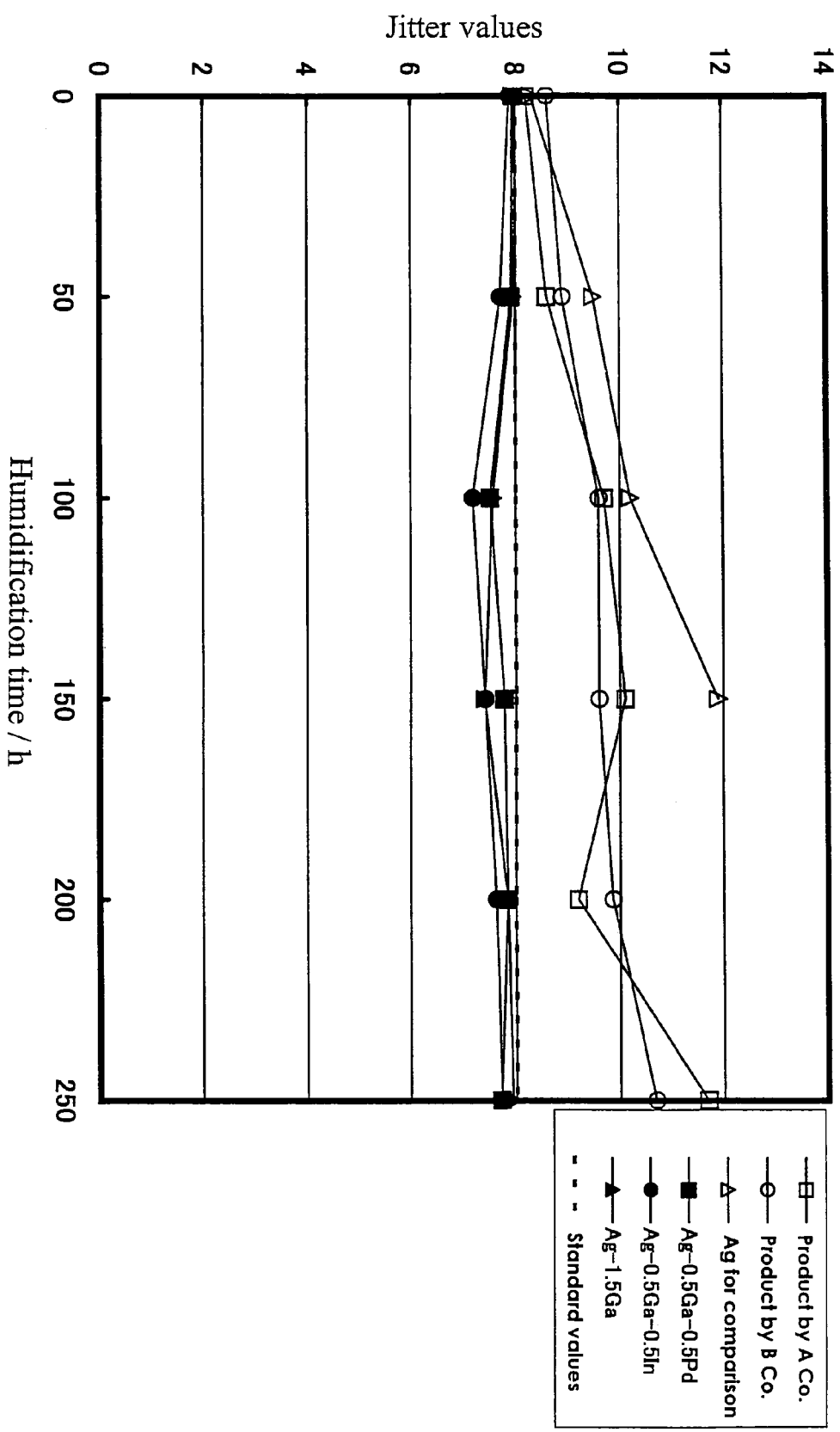
FIG. 1 shows results (jitter values) of an acceleration environmental test carried out on a DVD-R medium having a reflection film according to the present example.
Figure 2:
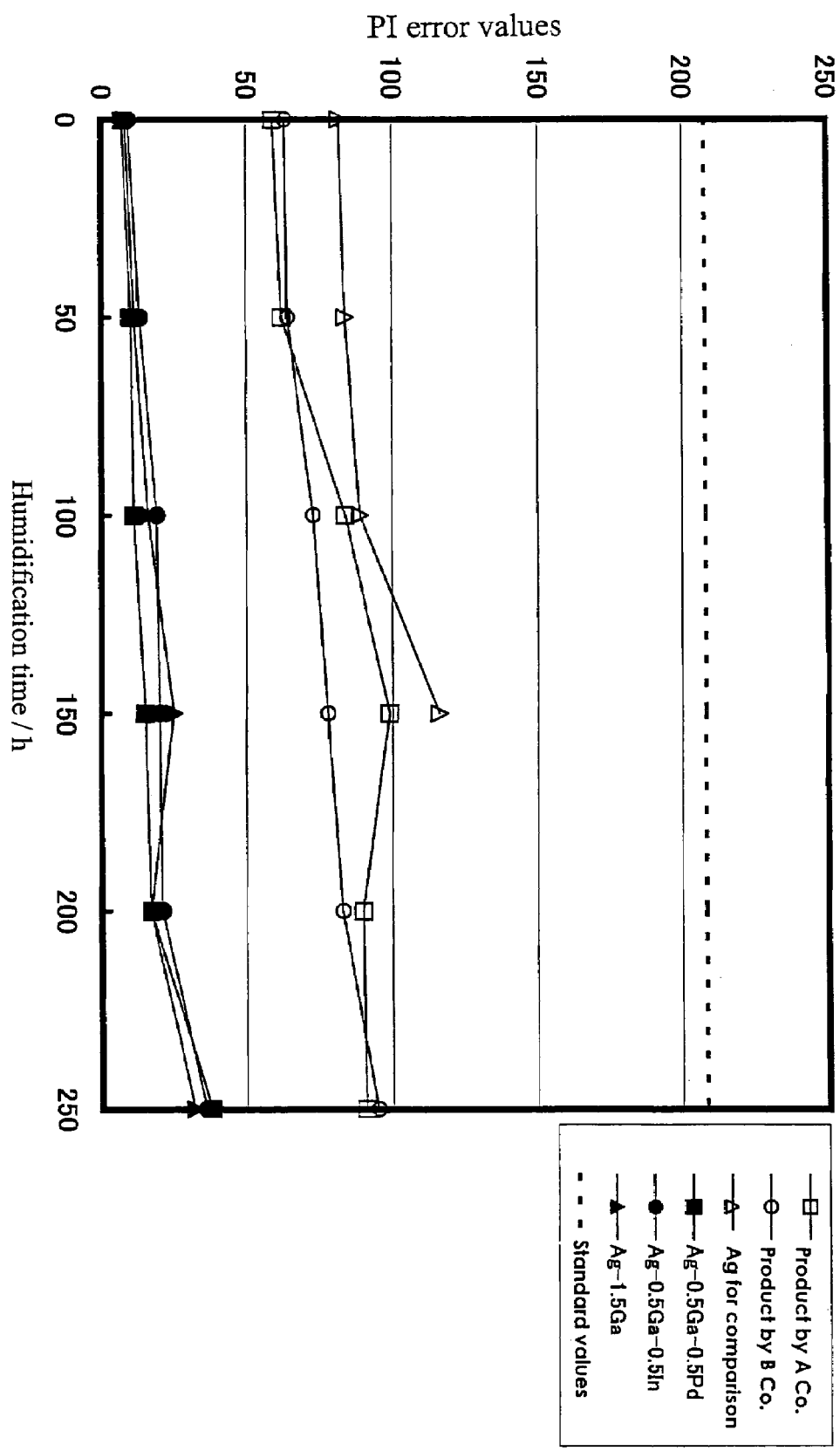
FIG. 2 shows results (PI error values) of an acceleration environmental test carried out on a DVD-R medium having a reflection film according to the present example.
Figure 3:
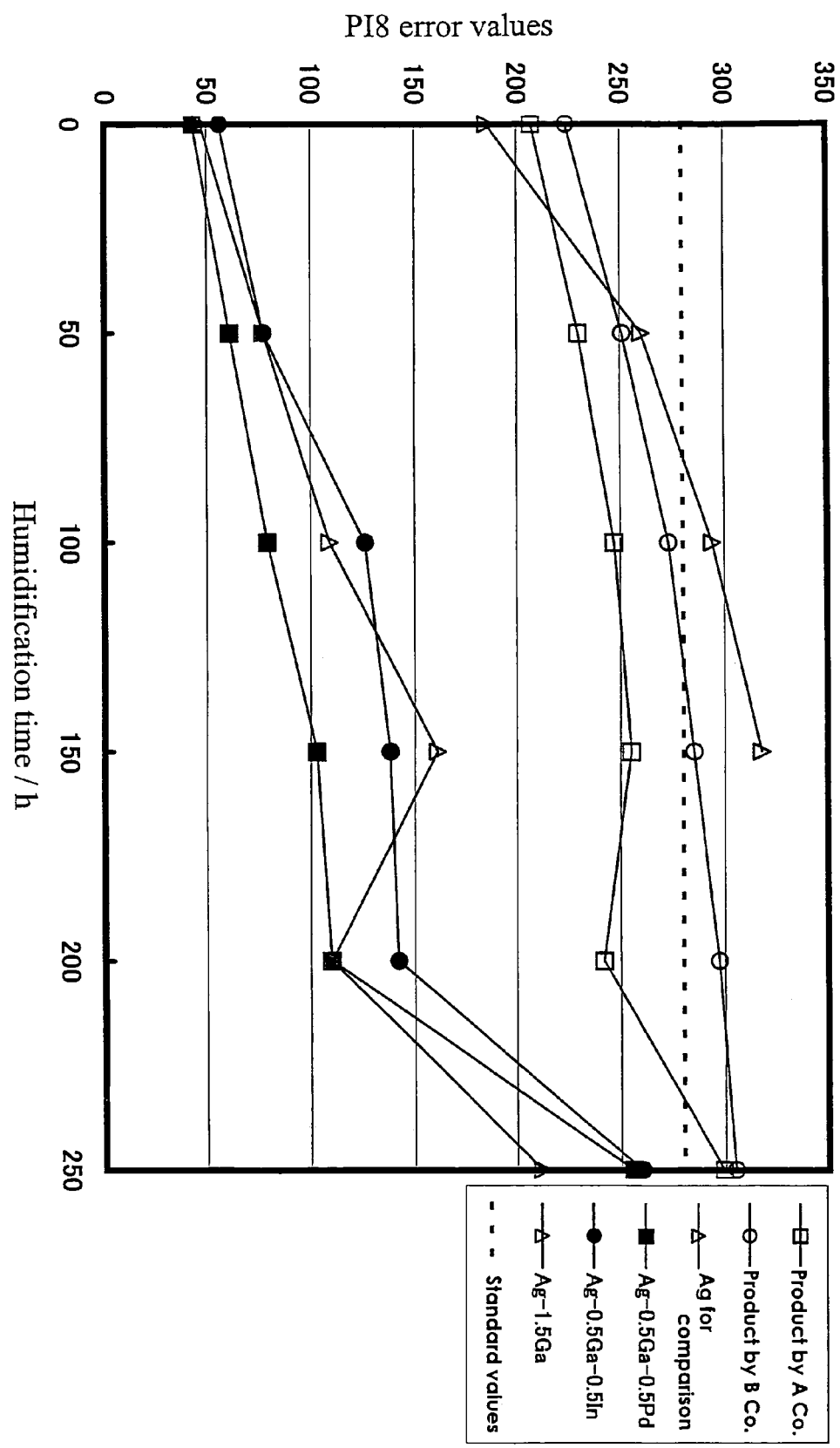
FIG. 3 shows results (PI8 error values) of an acceleration environmental test carried out on a DVD-R medium having a reflection film according to the present example.
Figure 4:
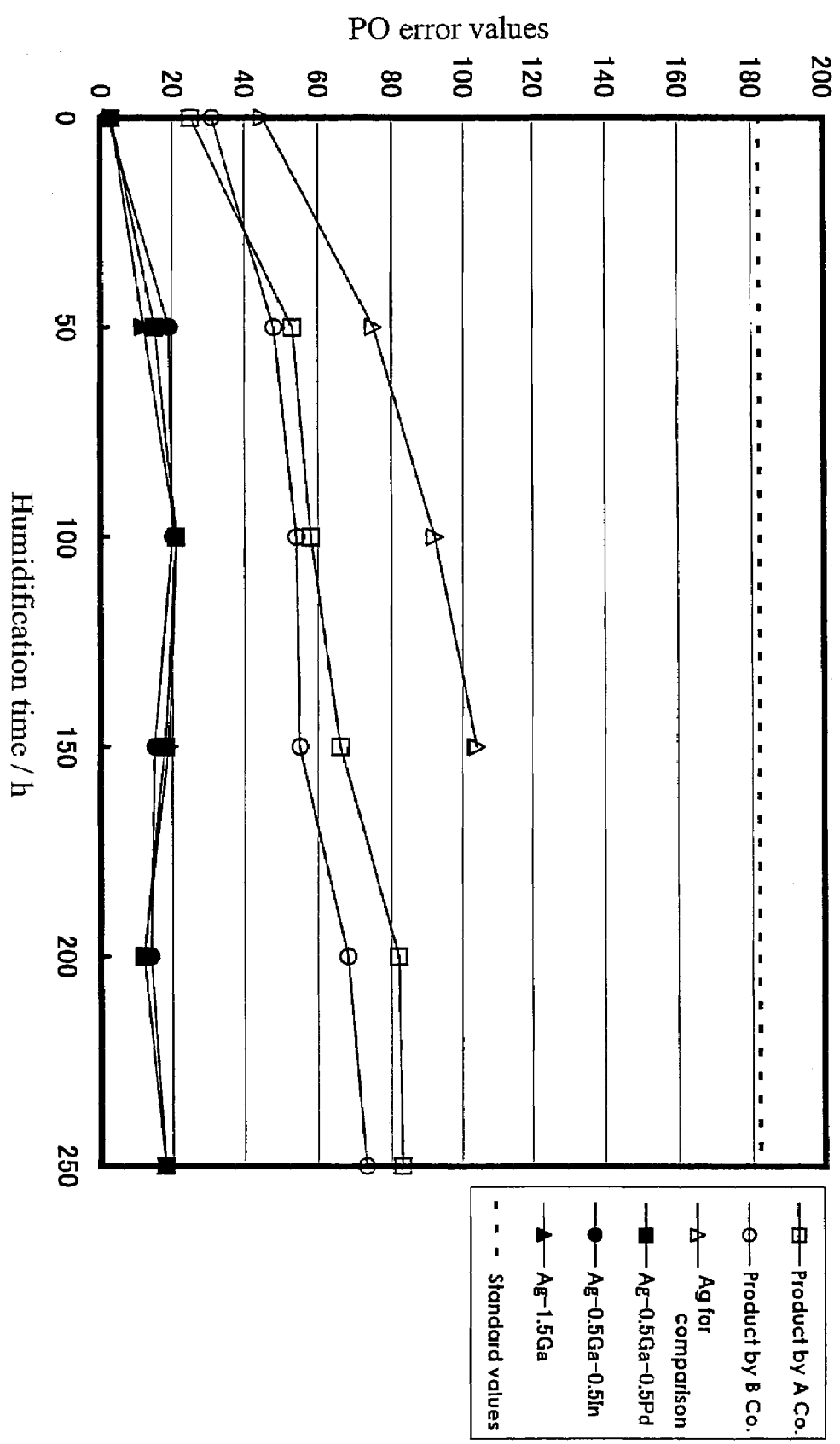
FIG. 4 shows results (PO error values) of an acceleration environmental test carried out on a DVD-R medium having a reflection film according to the present example.

What is claimed is:

1. A silver alloy for use in a reflection film, consisting of silver, gallium as a first additive element, and at least either dysprosium or thulium as a second additive element.

2. A silver alloy for use in a reflection film according to claim 1, wherein said second additive element is dysprosium.

3. A silver alloy for use in a reflection film according to claim 1, wherein the total concentration of the additive elements is 0.01-5.0 atomic %.

4. A silver alloy for use in a reflection film according to claim 3, wherein the total concentration of the additive elements is 0.01-1.5 atomic %.

5. A sputtering target consisting of the silver alloy, which silver alloy being defined in claim 4.

6. A sputtering target consisting of the silver alloy, which silver alloy being defined in claim 3.

7. A sputtering target consisting of the silver alloy, which silver alloy being defined in claim 1.

8. A silver alloy for use in a reflection film according to claim 1, wherein said second additive element is thulium.

* * * * *